US006538791B2

(12) United States Patent
Trezza

(10) Patent No.: US 6,538,791 B2
(45) Date of Patent: Mar. 25, 2003

(54) METHOD AND APPARATUS FOR REAL TIME OPTICAL CORRELATION

(75) Inventor: John A. Trezza, Nashua, NH (US)

(73) Assignee: Teraconnect, INC, Nashua, NH (US)

(*) Notice: Subject to any disclaimer, the term of this patent is extended or adjusted under 35 U.S.C. 154(b) by 21 days.

(21) Appl. No.: 09/727,941

(22) Filed: Dec. 1, 2000

(65) Prior Publication Data

US 2002/0067535 A1 Jun. 6, 2002

Related U.S. Application Data

(60) Provisional application No. 60/168,490, filed on Dec. 2, 1999.

(51) Int. Cl.[7] ............................ G02B 26/00; G41B 9/02; G41B 9/021
(52) U.S. Cl. ................. 359/237; 356/521; 356/457; 359/561; 359/248
(58) Field of Search ............................ 359/237, 29, 20, 359/11, 254, 561, 259, 261, 248; 356/457, 458, 323, 521; 382/4, 278, 279; 257/431, 432

(56) References Cited

U.S. PATENT DOCUMENTS

| | | | |
|---|---|---|---|
| 5,276,636 A | 1/1994 | Cohn | |
| 5,479,257 A | * 12/1995 | Hashimoto | .................. 356/457 |
| 5,488,504 A | 1/1996 | Worchesky et al. | |
| 5,606,457 A | 2/1997 | Chiu et al. | |
| 5,619,596 A | 4/1997 | Iwaki et al. | |
| 5,659,637 A | 8/1997 | Bagley, Jr. et al. | |
| 5,675,436 A | 10/1997 | Damen et al. | |
| 5,883,743 A | 3/1999 | Sloan | |
| 5,900,624 A | 5/1999 | Verghese et al. | |
| 6,163,378 A | * 12/2000 | Khoury | ...................... 356/457 |

OTHER PUBLICATIONS

PCT International Search Report dated Jun. 1, 2001 of International application No. PCT/US00/42443 filed Dec. 1, 2000.
M. Ajmone Marsan et al, Modelling Slotted Multi–Channel Ring All–Optical Networks, *IEEE*, 1997, p. 146–153.
Marco Ajmone Marsan et al, Access Protocols for Photonic WDM Multi–Rings with Tunable Transmitters and Fixed Receivers, *SPIE*, pp. 59–72, vol. 26921, Feb. 1996.
Carl Beckmann, Applications: Asynchronous Transfer Mode and Synchronous Optical Network, *Handbook of Fiber Optic Data Communication*, 1998, pp. 385–414, Academic Press.
Floyd E. Ross, An Overview of FDDI: The Fiber Distributed Data Interface, *IEEE Journal on Selected Areas in Communications*, Sep. 1989, pp. 1043–1051, vol. 7 No. 7.

* cited by examiner

*Primary Examiner*—Georgia Epps
*Assistant Examiner*—Omar Hindi
(74) *Attorney, Agent, or Firm*—Maine & Asmus

(57) ABSTRACT

A system for performing real time optical comparisons using an optical correlator permits comparing a sampled image to a wide variety of reference images through the utilization of a multiple quantum well spatial light modulator which is utilized to rapidly present a large number of reference images for correlation. The utilization of the multiple quantum well spatial light modulator as the spatial light modulator in a van der Lugt image correlator in combination with a spectrometer permits optical comparisons at 300,000 frames per second versus 10,000 frames per second, the best case for liquid crystal based spatial light modulators.

13 Claims, 3 Drawing Sheets

METHOD AND APPARATUS FOR REAL TIME OPTICAL CORRELATION

RELATED APPLICATIONS

The present application claims priority from U.S. Provisional Patent Application No. 60/168,490 filed Dec. 2, 1999.

FIELD OF INVENTION

This invention relates to optical correlators and more particularly to a method and apparatus for improving the frame rate to permit real time processing in which a sample image is compared to a number of reference images.

BACKGROUND OF THE INVENTION

In general, optical correlations have been performed using van der Lugt optical correlators. These correlators utilize spatial light modulators to be able to present for correlation a large number of reference images to which a sampled image is to be compared.

The problem with the prior art optical correlators is the speed with which the reference images can be presented and compared with the sample image. For liquid crystal spatial modulators the frame rate is slow at 10 kHz. Unfortunately, a 10 kHz spatial light modulator is much too slow for real time optical correlator applications. Note that such optical correlators have been devised by Dr. Christina Johnson and Dr. Jim Kirsch.

Even slower are magneto-optical devices which operate at 500 Hz and are intolerably slow. The reason for the slowness of a magneto-optical device is the high voltage swings, in terms of kilovolts, in order for the modulator to switch from one state to another.

Were fast optical comparators realizable, then spatial pattern matching of a fine grain nature could be accomplished in real time. Such optical comparators would have immediate application in detecting and locating defects in semiconductor devices in which it is useful to inspect many areas on a semiconductor chip or substrate to compare them against a "known good". This is particularly useful for inspection of field programmable gate arrays, FPGAs, and digital signal processors or DSPs which are embedded processors. In general, spatial pattern matching is exceptionally useful for any electronic chips including DSPs, ASICS, wafer level devices, die level devices and memory. The inspection done optically is used to detect where there is a deviation from a reference and where it is located. A catalog is then generated of expected defects. If one can perform 300,000 correlations per second, one can identify many potential defects in a large expanse of semiconductor substrate.

Optical pattern recognition is also extremely important in the medical field. Most importantly real time optical pattern recognition is a requirement for mammography, pap smear analysis, nuclear magnetic residence or NMR images and DNA mapping involving recognizing the pattern of genes. It is important, for instance, to be able to recognize the number of cancer cells in a pap smear or artifacts in mammography with a high degree of reliability. Spatial pattern matching is an exceedingly accurate way of determining the results of a mammography or pap smear.

However, for all of the above applications the number of reference images to be presented for comparison is quite large. Were optical pattern recognition to be performed through the utilization of the prior liquid crystal techniques, days rather than minutes would be required due to the inability to change reference images quickly.

Another application for real time spatial pattern matching is in the security area in which both face and finger print recognition is required. Here the number of pixels analyzed for a match is so large that any system which is not real time would not be practical. Certainly the slow optical recognition now available would preclude its use in ATM machines or at any place where the public is to be granted access such as to a building, room or other secure area.

Additionally, there is the field of signal identification. It is indeed possible to identify radar, sonar, voice, RF signatures and other types of electromagnetic signals through the utilization of optical correlation techniques in which signals are compared to known reference signals that are encoded as optical images. Identification of friend or foe (IFF) and sonar trace matching are some of the military applications for which optical comparators have major application, assuming real time capability.

Another application for real time optical processing is in hyper spectral imaging. Spectral information for each pixel is sometimes available for data pixels in which one of the variables is wavelength. Thus the frequency or wavelength of the particular data pixel can be ascertained in one embodiment through optical correlation techniques, assuming such correlations could be done in a very rapid fashion. Moreover, spatial frequency detection in images, such as for instance the detection of edges in a photograph, or noise can be an application for optical correlators. In both of the above cases identifying the temporal frequency and/or spatial frequency of a data point in the form of a pixel through the utilization of matching with reference images is an exceedingly accurate way of defining matches.

Thus, whether optical processing is utilized in the checking of semiconductor arrays, for medical uses, for security, or for signal data stream or image analysis, there is a requirement for the ability to present large numbers of reference images to which a sample image is to be correlated.

By way of further background, in spite of remarkable advances in integrated circuit technology over the last three decades, for the most part, calculations are still done serially. Consequently, the capability of implanting significant signal processing capabilities that are intrinsic to many optical systems has remained a major challenge. In some cases, for example with the implementation of Fast Fourier Transform (FFT) methods, specialized chips have been developed that significantly speed up the calculations. However, nothing compares with the massive parallel processing capability associated with the speed with which a Fourier transform can be obtained optically.

One particular application of optical signal processing, and one in which the current technology has proven only modestly successful is that of optical correlation. Optical correlation is a process that uses optical methods to determine whether two images are similar. There is a very large market to be tapped into if a versatile optical correlator can be developed.

One problem which needs to be solved is how to enable real time correlation of objects in optical image correlators.

Unless the orientation of objects in the images being subjected to an optical correlation measurement is almost exactly the same, two images of the exact same object will not appear to be of the same object. In other words, the orientation can only differ by a few degrees. This restriction means that an image of a given object must be compared to a great many images of the reference object to which it is being compared before a good correlation can be found. A large number of images is required because of the need to have views of the object from as many orientations as possible. These comparisons require a large number of calculations, so significant computational speed is needed to complete the correlation calculation for each orientation in a reasonable time.

Existing optical image correlators are so slow that only a few orientations of an image can be correctly correlated per second for complex images. This slow speed dramatically limits the potential of optical image correlators to meet the demands of systems that need optical correlation capability applied to objects that are oriented in arbitrary directions. What is needed is a way of enabling real time correlation of objects in an optical image correlator.

The question then becomes how to implement an optical image correlator that is significantly faster than correlators made with liquid crystals.

A key component of an optical image correlator is a spatial light modulator (SLM). A spatial light modulator is a device that has a two-dimensional array made up of pixels. Each pixel can be controlled to allow one to modulate the reflectivity or phase, or both of an incident beam. By varying the driving voltage and making a phase grating, the phase can be modulated. Thus, by applying a voltage gradient across a spatial light modulator, the beam can be steered. By modulating the reflectivity on a pixel-by-pixel basis, a diffraction grating can be created. By combining the two, a diffraction pattern can be steered. The speed at which this capability can be implemented is very important.

Current spatial light modulators are made predominately of liquid crystals, which are long-chain organic molecules. Their response is slow, but satisfactory for simple display purposes. Their bandwidth is typically a couple of hundred hertz, and at most approximately 1 kHz. However, liquid crystal arrays with bandwidths as high as 10 kHz may be possible. Unfortunately, even a 10 kHz spatial light modulator is much too slow for real time applications of optical image correlators. What is needed is a way of implementing a correlator that is significantly faster than correlators made using liquid crystals or CCD arrays.

Note, U.S. Patents relating to optical correlators include U.S. Pat. Nos. 5,488,504; 5,883,743; 5,659,637; 5,276,636; and 5,900,624.

SUMMARY OF THE INVENTION

In the subject invention, the way in which real time capability is achieved in optical correlation is to provide that the spatial light modulator be in the form of a multiple quantum well device. Such a multiple quantum well device is described in U.S. Pat. No. 5,488,504 issued to Terrance L. Worchesky at al in which a hybridized asymmetric Fabry-Perot quantum well light modulator is described. In the subject invention the spatial light modulators are formed by arrays of multiple quantum well gallium arsenide-based devices.

It is a feature of the multiple quantum well device that they can switch as quickly as an electrical signal to them can be changed. This means that the bandwidth is approximately 100 Giga hertz which means that the maximum frame rate is 100 billions of frames per second instead of 10,000 frames per second, which is the best case with liquid crystal based devices. Such devices are typically made of layers of gallium arsenide. Note that the current state of the art with gallium arsenide devices is 300,000 frames per second, where the data rate into the devices from CMOS circuitry is the limiting factor.

The multiple quantum well devices are used in a Van Der Lugt image correlator which is based on a Fourier transform technique that compares converted input images with filters. The filters are created by Fourier transforming reference images and converting them into binary amplitude data. The system operation begins with the image to be identified, i.e. the sample image, being displayed on the input spatial light modulator. The image is first illuminated by a laser beam. Next, the modulated image is reflected onto a Fourier transform lens where it is converted into a Fourier transformed image. The transform image is imaged onto a second spatial light modulator, with the second spatial light modulator providing a Fourier transform of the reference image to be used, with the Fourier transform acting as a filter of the reference image. The identification process involves multiplying the Fourier transform of the input image with the transformed reference image. The output then passes through an inverse Fourier transform lens and is displayed, in one embodiment, on a CCD camera.

A positive correlation appears as bright spot or correlation peak. In one embodiment, a second CCD camera allows an operator to see the input image.

Note that in one embodiment, optical correlation is performed by using reference filters in which the reference filters are Fourier transformed reference images. These filters are designed using amplitude encoded binary phase only principles and are referred to herein as BPOF's. BPOF's are used because of their high discrimination capabilities.

Because the multiple quantum well devices can switch at the rate of the drive signal, presently the subject optical image correlator has a functional capability of 300,000 frames per second and is extendable to billions of frames per second.

In summary, a system for performing real time optical comparisons using an optical correlator permits comparing a sampled image to a wide variety of reference images through the utilization of a multiple quantum well spatial light modulator which is utilized to rapidly present a large number of reference images for correlation. The utilization of the multiple quantum well spatial light modulator as the spatial light modulator in a van der Lugt image correlator in combination with a spectrometer permits optical comparisons at 300,000 frames per second versus 10,000 frames per second, the best case for liquid crystal based spatial light modulators.

BRIEF DESCRIPTION OF THE DRAWINGS

These and other features of the subject invention will be better understood in connection with the Detailed Description in conjunction with the Drawings of which.

DETAILED DESCRIPTION

In the subject invention, in one embodiment, a system is described that uses flip-chip mounted, GaAs based spatial light modulators to enable the implementation of a high-speed correlator on a chip. The illustrated embodiment exploits optoelectronic flip-chip techniques to provide high-speed spatial light modulation with a significant increase in frame rate over that currently available.

Figure 1:
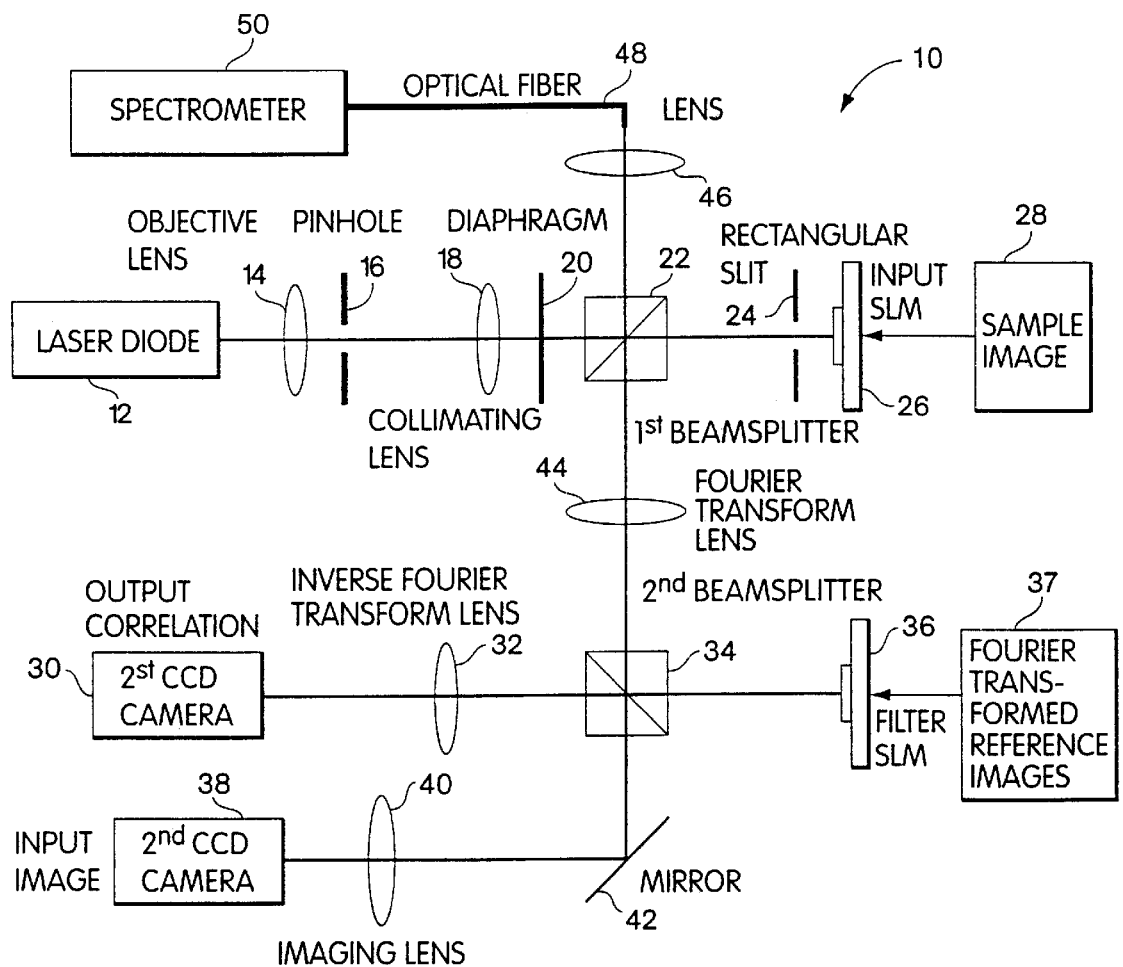
FIG. 1 is a schematic diagram of the subject invention showing a van der Lugt image correlator and the use of spatial light modulators in the form of multiple quantum well devices.

Referring now to FIG. 1, the subject correlator 10 includes a laser diode 12, an objective lens 14, a pinhole 16, a collimating lens 18, a diaphragm 20, a first beamsplitter 22, a rectangular slit 24, and an input multiple quantum well based spatial light modulator 26. Spatial light modulator 26 is provided with a sample image 28.

The system further includes a first CCD camera 30, an inverse Fourier transform lens 32, a second beamsplitter 34, and a filter multiple quantum well based spatial light modulator 36. Reference images are Fourier transformed and provided as illustrated at 37 to modulator 36. In addition, the system includes a second CCD camera 38, an imaging lens 40, and a mirror 42. Finally, the system includes a Fourier transform lens 44, a lens 46, an optical fiber 48, and a spectrometer 50.

In one embodiment, the laser diode operates at 860 nm, but the subject invention would work equally well if it operated in the range of 400 nm to 1600 nm. The pinhole is 25 um in diameter. The collimating lens has a focal length of 300 mm. The combination of the objective lens 14, the pinhole 16, and the collimating lens 18 form a beam expander with a spatial filter. Preferably, the Fourier transform lens 44 has a focal length of 231 mm, and that of the inverse Fourier transform lens 32 is 250 mm. The imaging lens 40 has a focal length of 225 mm. Both beamsplitters 22 and 34 are 50:50 beamsplitters.

Figure 2:
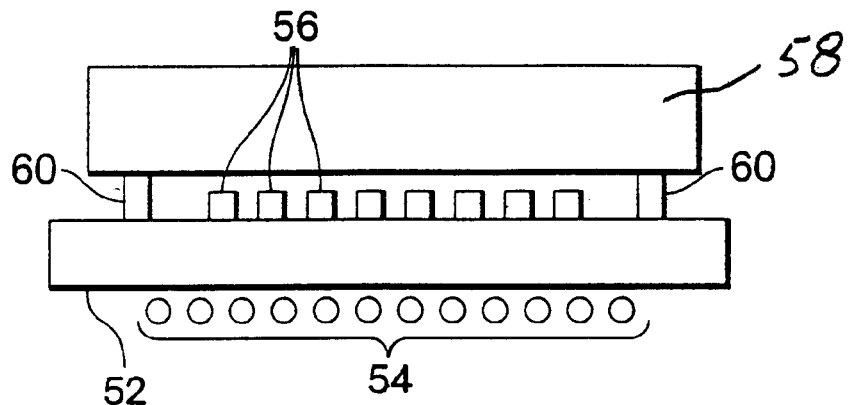
FIG. 2 is a side view of a multiple quantum well spatial modulator illustrating the utilization of a ball grid array and a CMOS substrate on which is mounted an array of quantum well devices.
Figure 3:
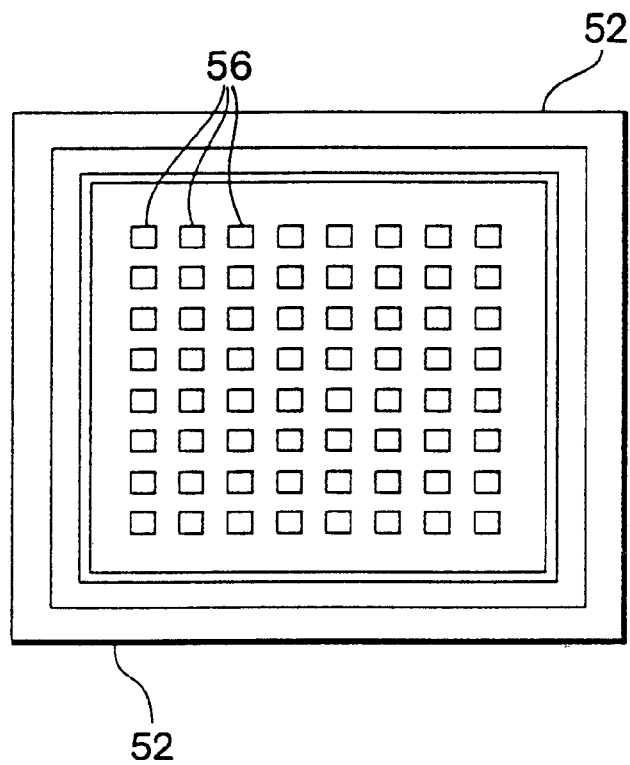
FIG. 3 is a top view of the array of multiple quantum well devices to be driven by connections through the ball grid array of the device of FIG. 2.

In the present invention, the spatial light modulators are formed of arrays of multiple quantum well (MQW) GaAs based devices. A cross sectional view of a multiple quantum well spatial light modulator is shown in FIG. 2, and from a top view in FIG. 3. Here the multiple quantum well spatial light modulator has a flip chip design in which a CMOS substitute 52 has a ball grid array 54 of solid balls. On top of this substrate is an array of multiple quantum well devices 56. A quartz cover 58 is provided on epoxy standoffs 60 in one embodiment. Alternatively the cover could be made to touch the top of the pixels and so would not be resting on epoxy standoffs.

Note that the multiple quantum level devices can switch as quickly as an electrical signal to them can be changed. The bandwidth is approximately 100 GHz. This means that the maximum frame rate is 100 billion frames/second instead of 10,000 frames/second that is the best case with liquid crystal based spatial light modulators. The current state of the art with GaAs based devices is 300,000 frames/sec, where the lateral data rate into the devices from the CMOS circuitry is the limiting factor.

Since in the existing art the limiting factor is how the spatial light modulator is constituted, the use of a multiple quantum well device based clearly means that there is an increase in the number of frames per second that can be processed. In fact, there is an increase in several orders of magnitude in the speed of the correlator in the present invention over the prior art. Thus, the subject invention solves the need to implement an optical image correlator that is significantly faster than are correlators made with liquid crystals.

The system depicted in FIG. 1 is a van der Lugt image correlator and it is based on Fourier transform techniques that compare converted input images with reference images provided by the filters. Filters are created by Fourier transforming reference images, and converting them to binary amplitude data.

System operation begins with the image 28 to be identified being coupled to input modulator 26. Image 28 is first illuminated by a collimated laser beam from laser 12. The modulated image is reflected onto Fourier transform lens 44 where it is converted to a Fourier transformed image. The transformed image is then directed to modulator 36 which contains a Fourier transformed rendition of the image to be recognized. The identification process involves multiplying the Fourier transform of the input image with the Fourier transformed reference image. The output then passes through inverse Fourier transform lens 32 and is displayed on CCD camera 30. A positive correlation appears as a bright spot, or a correlation peak. The second CCD camera, camera 38, allows the operator to see the input image.

As mentioned above, optical correlation is performed using reference filters. The Fourier transform filter is designed using amplitude encoded binary phase only principals (BPOF) with the BPOF filters used because of their high discrimination capability.

Thus, the present method for operating a high-speed optical correlator consists of displaying the image to be identified on the input spatial light modulator; illuminating the image with a collimated laser beam; passing the modulated image through a Fourier transform lens; projecting the transformed image onto the modulator which contains a reference filter of the image to be recognized, thus multiplying the Fourier transformed input image with the reference filter; passing the output through an inverse Fourier transform lens; and displaying that image on a CCD camera. Rapid presentation of reference images for correlation is provided by repeating the above steps with different reference images until a positive correlation is found.

It will be appreciated that optical image correlation is based on a two dimensional projection of a three dimensional object. It depends strongly on the filter image being quite close in orientation to the orientation of the image being identified. With the use of multiple quantum well devices, the extraordinarily high frame rate allows virtually every conceivable orientation of candidate images to be correlated with an image, and for that comparison to be done within seconds, i.e., in real time.

Figure 4:
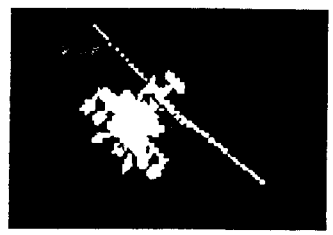
FIG. 4 is a representative input image to be compared with a series of reference images.
Figure 5:
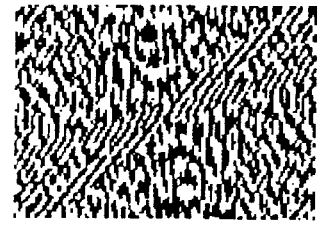
FIG. 5 is a diagrammatic representation of a reference image corresponding to an incorrect reference filter.
Figure 6:
FIG. 6 is a diagrammatic representation of a reference image corresponding to a correct reference filter.
Figure 7:
FIG. 7 is an illustration of the result of a correlation by the subject system in which there is no correlation between the input image of FIG. 4 and the incorrect filter image of FIG. 5.
Figure 8:
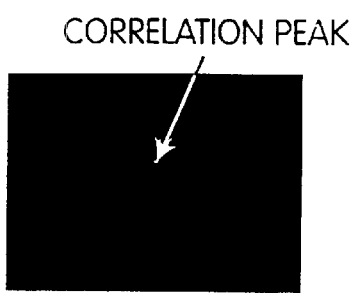
FIG. 8 is an illustration of the result of a correlation by the subject system in which there is a correlation peak illustrating the correlation between the input image and the image associated with the matched filter.

An example of the correlation process is depicted in FIGS. 4 through 8. FIG. 4 is a representative input image to be compared with a series of reference images. FIG. 5 is a diagrammatic representation of a reference image corresponding to an incorrect reference filter. FIG. 6 is a diagrammatic representation of a reference image corresponding to a correct reference filter. FIG. 7 is an illustration of the result of a correlation by the subject system in which there is no correlation between the input image of FIG. 4 and the incorrect filter image of FIG. 5. FIG. 8 is an illustration of the result of a correlation by the subject system in which there is a correlation peak illustrating the correlation between the input image and the image associated with the matched filter.

As a result a high-speed optical correlator is provided that can perform correlations at orders of magnitude higher speed than previous systems.

Another novel aspect of this invention is an optical image correlator with the functional capability of 300,000 frames/sec and expandability to billions of frames per second.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

Moreover, other embodiments will occur to those skilled in the art and are within the following claims:

What is claimed is:

1. A method for improving the performance of optical comparators to provide real time performance, comprising the steps of:

providing an optical comparator with a pair of optical light modulators, an input spatial light modulator to generate a sample image and a reference spatial light modulator to generate a number of reference images, at least the spatial light modulator which generates the reference images being a multiple quantum well device having an array of pixels; and, driving the multiple quantum well device with signals representative of a Fourier transform of reference images at a rate above 300,000 frames/sec such that the number of frames/sec for optical comparison of the sample image and the reference images is dependent only on the rate at which the multiple quantum well device is driven whereby real time optical correlations can be performed.

2. The method of claim 1, wherein the comparator is a van der Lugt correlator.

3. The method of claim 1, wherein the driving step includes the step of driving the multiple quantum well device at 300,000 frames/second.

4. The method of claim 3, wherein the driving step includes using a CMOS driver.

5. The method of claim 1, wherein the optical comparison is performed by driving the input spatial light modulator that generates the sample image with the sample image, illumination the input spatial light modulator with a collimated laser beam, directing the reflected image from the input spatial modulator through a Fourier transform lens to the reference spatial light modulator for multiplying the Fourier transformed sample image with that on the reference spatial modulator and passing the result through an inverse Fourier transform lens to a detector.

6. Apparatus for improving the performance or optical comparators to provide real time performance, comprising:

an optical comparator having a pair of optical light modulator; an input spatial light modulator to generate a sample image, and a reference spatial light modulator to generate a number of reference images, at least the spatial light modulator which generates the reference images being a multiple quantum well device having an array of pixels; and, a driver for driving the multiple quantum well device with signals representative of a Fourier transform of reference images at a rate above 300,000 frames/sec such that the number of frames/sec for optical comparison of the sample image and the reference images is dependant only on the rate at which the multiple quantum well device is driven, whereby real time optical correlations can be performed.

7. The apparatus of claim 6, wherein said comparator is a van der Lugt correlator.

8. The apparatus of claim 6 wherein said multiple quantum well device is driven at 300,000 frames/second.

9. The apparatus of claim 8, wherein said driver includes a CMOS driver.

10. The apparatus of claim 6, wherein said optical comparator performs the optical comparison by driving said input spatial light modulator that generates the sample image with the sample image, illuminating the input spatial light modulator with a collimated laser beam, directing the reflected image from the input spatial light modulator through a Fourier transform lens to the reference spatial light modulator for multiplying the Fourier transformed sample image with that on the reference spatial spatial modulator and passing the result through an inverse Fourier transform lens to a detector.

11. The apparatus of claim 6, wherein said optical comparator includes means for driving said spatial light modulator with said sample image, a laser for producing a collimated laser beam that illuminates said input spatial light modulator, a Fourier transform lens for receiving the reflected image from said input spatial light modulator and for focusing said reflected image onto said reference spatial light modulator, thus multiplying the Fourier transformed sample image with that on said reference spatial light modulator, an inverse Fourier transform lens for receiving the multiplied result and providing an inverse Fourier transform thereof, and a detector for detecting the output of said Fourier Transform lens.

12. The method of claim 1 wherein said multiple quantum well device has a bandwidth of about 100 GHz.

13. The apparatus of claim 6 wherein said multiple quantum well device has a bandwidth of about 100 GHz.

* * * * *